Figure 1:
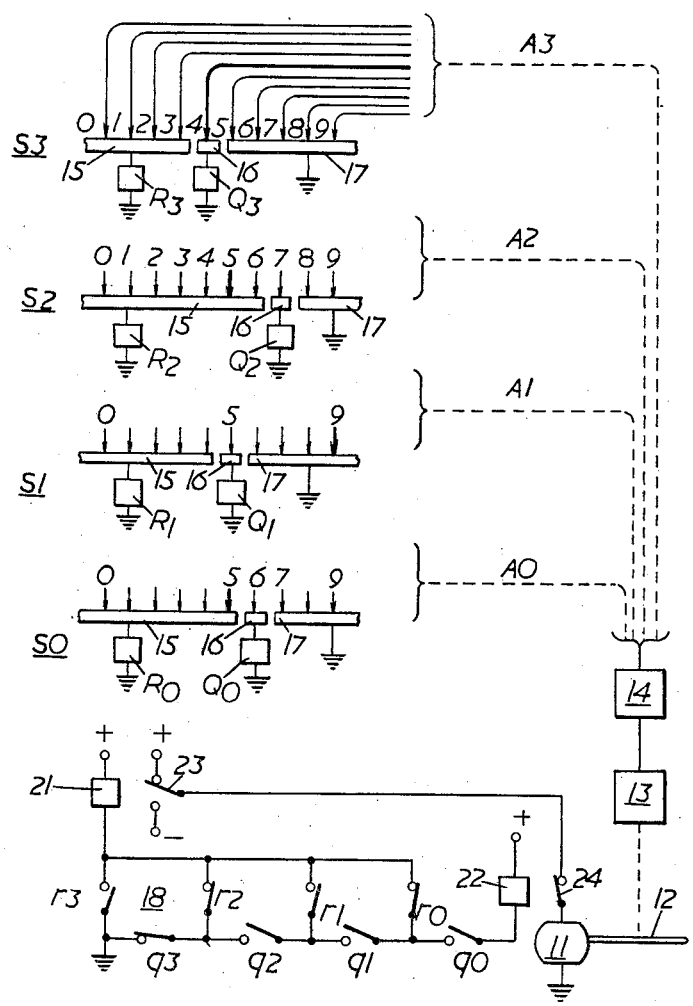

March 5, 1963

J. T. COADY-FARLEY ETAL
SERVO APPARATUS FOR ADJUSTING THE
POSITION OF A MOVABLE MEMBER 3,080,511

Filed June 23, 1959

4 Sheets-Sheet 1

Inventors
J.T. Coady-Farley
D.W.H. Hampshire
By
Cameron, Kerkam & Sutton
Attorneys

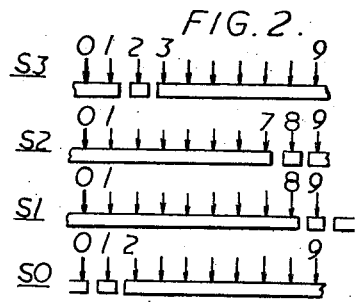
FIG. 2.
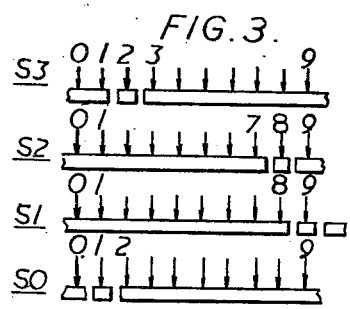
FIG. 3.
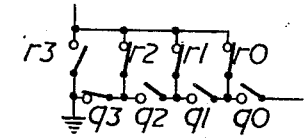
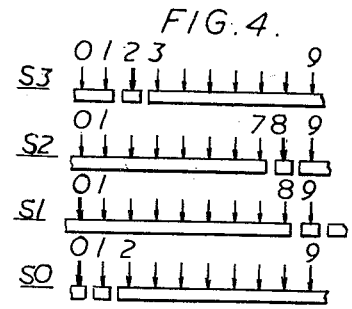
FIG. 4.
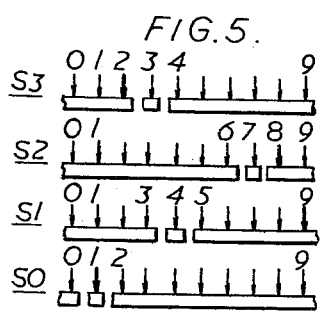
FIG. 5.
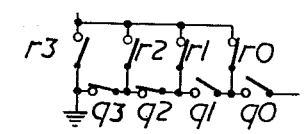
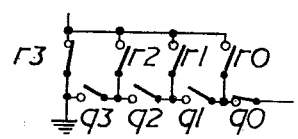
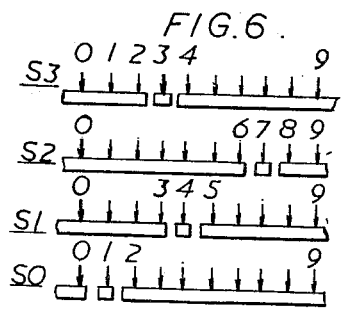
FIG. 6.
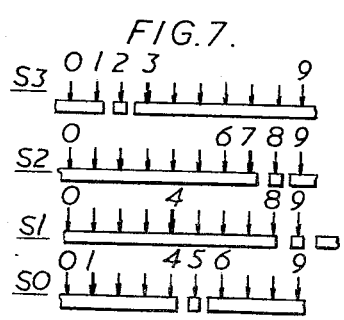
FIG. 7.
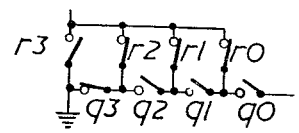
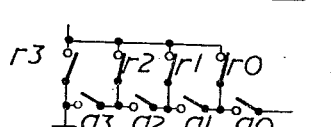
Inventors
J.T. Coady-Farley
D.W.H. Hampshire
By
Cameron, Kerkam & Sutton
Attorneys March 5, 1963

J. T. COADY-FARLEY ETAL
SERVO APPARATUS FOR ADJUSTING THE
POSITION OF A MOVABLE MEMBER 3,080,511

Filed June 23, 1959

4 Sheets-Sheet 3

Inventors
J. T. Coady-Farley
D. W. H. Hampshire
By
Cameron, Kerkam & Sutton
Attorneys

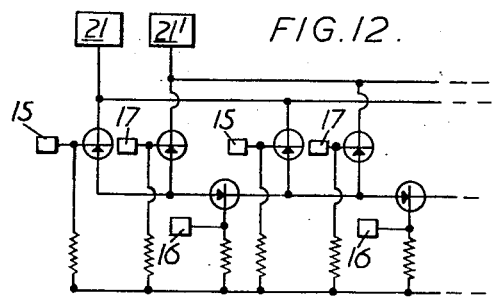
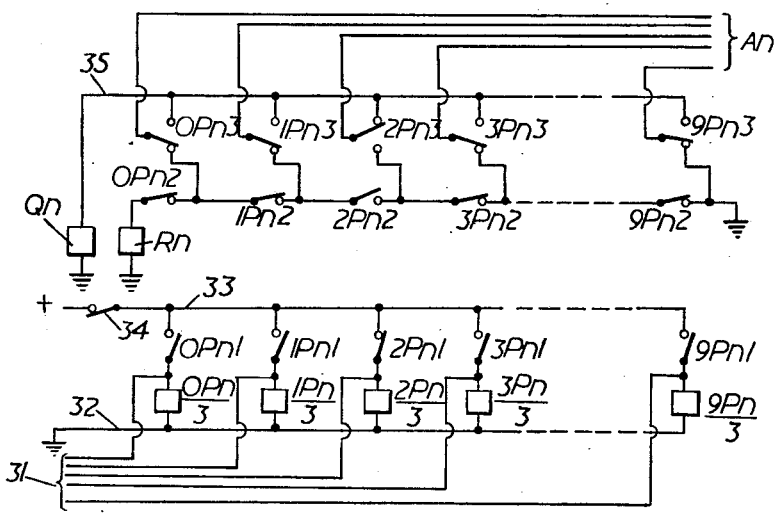

United States Patent Office 3,080,511
Patented Mar. 5, 1963

3,080,511
SERVO APPARATUS FOR ADJUSTING THE POSITION OF A MOVABLE MEMBER
James Train Coady-Farley and David William Holmes Hampshire, Edinburgh, Scotland, assignors to Ferranti, Limited, Hollinwood, Lancashire, England, a company of Great Britain and Northern Ireland
Filed June 23, 1959, Ser. No. 823,274
Claims priority, application Great Britain June 27, 1958
8 Claims. (Cl. 318—28)

This invention relates to electronic counters and specifically to apparatus for pre-setting a number in a counter arranged to be operated by an actuator.

The invention has particular application to machine-tool control system and will be described in that connection. It should however be understood that the invention is not restricted to such applications.

In certain machine-tool control systems it is known to employ a servo actuator which is arranged to adjust the position of an object such as a tool along a coordinate axis in response to some signal, such as a voltage, which energises the actuator. To indicate the position of the tool at any given moment there is provided an electronic counter of some kind which is also operated by the actuator and which accordingly indicates at any given moment by a number the point reached by the tool along the coordinate.

With such apparatus it is usually necessary to be able to preset the tool along the axis in an initial position from the origin. It is known to do this by means of a digital store in which is set the number representing the initial position of the tool. The servo system is then operated and as the actuator moves the tool from the origin along the axis towards the desired initial position the counter subtracts one digit from the store for each numeral position reached. This process continues until the store is empty, the tool being then in the required position with the number in the counter equal to the number originally preset in the store.

Such an arrangement depends for its operation on repetitive comparisons of the digit contents of store and counter, and apparatus hitherto disclosed for effecting this is somewhat complex and costly.

Where in such known apparatus it is necessary to preset the tool to a new desired position without first restoring it to the origin, it is necessary to enter in the store not the new value of the number but the difference, whether positive or negative, between the new value and the old.

An object of the present invention is to provide apparatus for the purpose stated of a more simple and less costly character and operating in a more direct manner than such apparatus as hitherto known.

Another object is to provide such apparatus in which a change in the value of the preset number may be effected without having to ascertain the difference between the new number and the previous number.

In accordance with the present invention, apparatus for pre-setting a number in an electronic counter arranged to be operated by an actuator includes for each power of the radix of a predetermined numerical system to the limit required a presettable selector having for each digit of that power a digit contact connected for distinctive energisation in accordance with the number in the counter, individual to each selector a first and a second switching device each for controlling a current path, arrangements for connecting any selected one of the digit contacts of the selector to said first switching device to cause it to complete the current path controlled by it when the selector is concordant, as hereinafter defined, arrangements for causing the second switching device to complete the current path controlled by it when the said selected contact is on a predetermined side of the distinctive digit contact, an actuator-controlling device which when energised causes the actuator to operate the counter in one sense to increase or decrease the count according as the said predetermined side is above or below the distinctive contact, as the case may be, a network of said current paths in the energising circuit of the actuator-controlling device to allow that device to be controlled by the second switching device of only the selector of highest power significance which is discordant, reversing means for causing the actuator to operate the counter in the opposite sense when the actuator-controlling device is not energised and at least one selector is discordant, and arresting means for stopping the operation of the actuator when all the selectors are concordant.

By "connected for distinctive energisation in accordance with the number in the counter" is meant connected so that at any given moment the digit contact corresponding to the digit value of that power according to the number in the counter at that moment is distinctive as regards its potential level in comparison with the other digit contacts for that power. The distinctive contact may for example be distinguished by being energised, whereas the other contacts are either energised in the opposite sense or at earth potential; or the distinctive contact may itself be at earth potential, the other contacts being energised.

By "the selected contact is on a predetermined side" of the distinctive contact is meant that the selected contact is engaging one of the other contacts which is either below or above—that is, is either of less or of greater digit significance than—the distinctive contact, according to the side predetermined.

The terms "concordant" and "discordant," as applied to a selector, means that the selected contact is, and is not, the distinctive contact, respectively.

Figure 8:
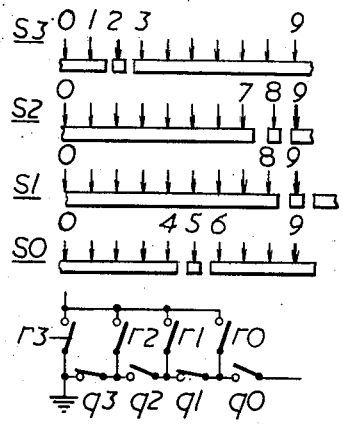
Figure 9:
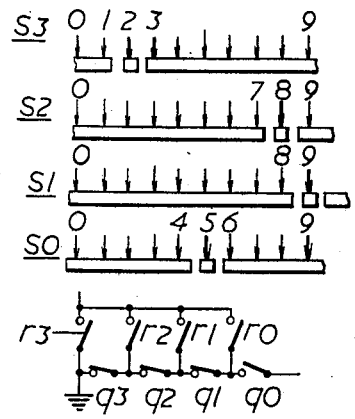
Figure 10:
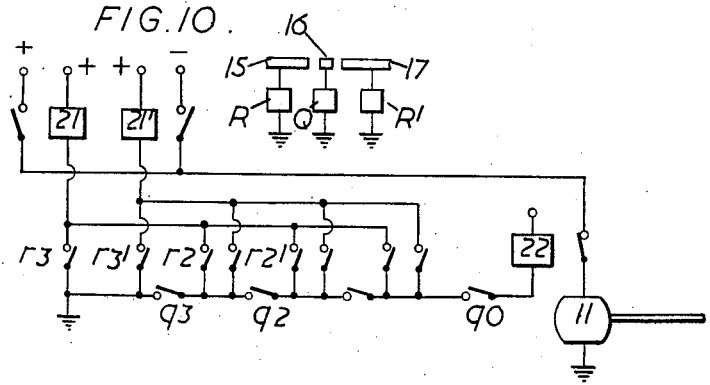
Figure 11:
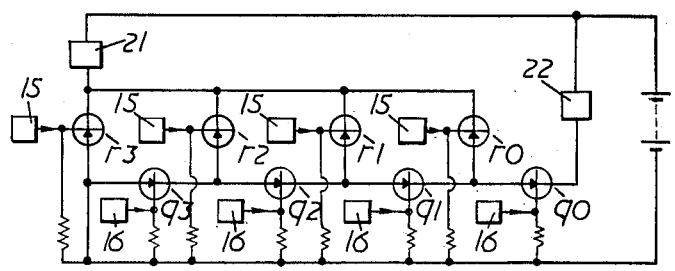

In the accompanying schematic diagrams,
FIGURE 1 shows one embodiment of the invention,
FIGURES 2 to 9 show portions of the diagram of FIGURE 1 during the operation of that embodiment,
FIGURES 10 to 12 each show a portion of FIGURE 1 modified in accordance with another embodiment, and
FIGURE 13 shows another embodiment of the invention.

In carrying out the invention in accordance with one form by way of example, see FIG. 1, tool-control apparatus includes a servo actuator 11 arranged to drive a machine tool (not shown) along a coordinate axis by way of a shaft 12. The actuator is also coupled to an electronic counter 13 which operates on the binary system and indicates by its count at any given moment the number which represents the position of the tool along the axis at that moment.

Arrangements are made for pre-setting the tool along the axis and simultaneously pre-setting a corresponding number in the counter. Whereas it is usually more convenient for such a counter to operate on the binary system it is usually convenient from the point of view of persons operating the apparatus that any number preset in the apparatus in correspondence with a preset position of the tool should be in the decimal scale. For each required power of ten, therefore, there is provided a presettable selector. It is assumed that only four such powers are required and the corresponding selectors are designated S0 to S3 for the zero, first, second, and third powers of ten respectively.

Each selector includes a bank of ten fixed "digit" contacts representing the digit values 0 to 9 of the power and designated by those numerals in the figure. The binary output of counter 13 is applied to a binary/decimal converter 14 having four arrays A0 to A3 each of ten output leads representing the zero, first, second, and third powers of ten respectively. The ten leads in each array are connected to the ten fixed contacts 0 to 9, each to each, of the selector of the same power. The arrangement is such that whenever counter 13 holds a number in binary form, converter 14 holds that number in decimal form, and represents it by energising in each array the one lead representing the digit value (including zero, where appropriate) of the power concerned, thereby energising the digit contact in the corresponding one of selectors S0 to S3. For example, when converter 14 holds the number 7350, the 7, 3, 5, and 0 digit contacts of selectors S3 to S0 respectively are energised from the converter by way of arrays A3 to A0. The ten contacts of each power are thus connected for energisation in accordance with the number in the counter, as that expression is defined above, the appropriate contact being distinctive as regards its potential level. In the present case this contact is distinctive because it is energised whereas the other contacts are not energised.

The digit contacts of each of selectors S3 to S0 are engaged by three movable contacts or wipers 15, 16, and 17. Wiper 16 engages only one digit contact at a time. Wiper 15 is a multiple wiper, long enough to engage nine of the digit contacts simultaneously and ganged to wiper 16 so as always to engage all the digit contacts of less digit significance than the digit significance of the contact engaged by wiper 16. Wiper 17 is also a multiple wiper; it is ganged to wiper 16 so as always to engage all the digit contacts of greater digit significance than that engaged by wiper 16.

In each selector, wipers 16 and 15 are connected to earth by way of first and second switching devices, individual to that selector, in the form of relays Q and R respectively, the relays being designated Q3, Q2, Q1, Q0, and R3, R2, R1, R0, in accordance with the power concerned. Wiper 17 is connected direct to earth, it being assumed that the output circuit of converter 14 requires that each lead has a return path even when not energised. Where this return path is not necessary, wiper 17 may be omitted from each selector.

Each relay controls a current path through a single pair of make contacts, $q3$ to $q0$, or $r3$ to $r0$, as the case may be. These eight pairs of contacts are connected in a network 18 to control the energisation of an actuator-controlling device and reversing means in the form of a relay 21, and arresting means in the form of a relay 22.

The energising circuit of relay 21 is completed to earth by way of four parallel current paths including respectively: (1) contacts $r3$; (2) contacts $r2$ and $q3$ in series; (3) contacts $r1$, $q2$, and $q3$ in series; and (4) contacts $r0$ and $q1$ to $q3$ in series. Hence the parallel connection in respect of the contacts controlled by the second switching device of a selector is completed by way of a series chain of the contacts of the first switching devices of the selectors of higher power significance. This "series chain" is of course absent in the case of contacts $r3$ of the selector of highest significance and consists of only contacts $q3$ in the case of contacts $r2$ of the next lower selector.

Relay 21 operates changeover or Make-and-Break contacts 23 which control the sense in which actuator 11 operates—i.e., the direction in which it moves the machine tool and actuates the counter 13. When the relay is energised, the Make contacts cause a positive potential to be applied to the actuator, thereby causing it to operate in the direction for moving the tool forward along the axis whilst proportionately increasing the count in the counter. When the relay is unenergised, reversing means in the form of the Break contacts and the spring which closes them cause the potential applied to the actuator to be negative, thereby causing it to move the tool back along the axis whilst proportionately decreasing the count.

The energising circuit of relay 22 is completed to earth by way of all the contacts $q3$ to $q0$ in series. This relay controls Break contacts 24 in the energising circuit of the actuator so as to arrest the actuator when the relay is energised.

In describing the operation of the invention the terms concordant and discordant will for convenience be used in their above-defined senses with reference to the presettable selectors. These terms accordingly indicate respectively the two conditions of a selector in which the selected contact—that is, the contact engaged by the single wiper 16—is, and is not, the distinctive contact energised by converter 14. In other words, these two conditions are those in which a selector at any given moment respectively agrees with and disagrees with the number in the counter at that moment.

For brevity, a digit contact will be referred to as being "above" or "below" some other digit contact where the digit represented by the first-mentioned contact is of greater significance, or of less significance, as the case may be, than the digit represented by the other contact.

In the accompanying drawings, the one distinctive contact of each of arrays A3 to A0 is indicated by a thickening of the lead to it. In FIG. 1 the number in the counter is 4595 whereas the number preset is 4756; hence selector S3 is concordant and the other three selectors discordant.

From a study of FIG. 1 the following points will be readily appreciated, the selector references being to the particular example shown in the figure:

(a) Where a selector is concordant (selector S3) its Q relay is energised but its R relay is not; consequently its $q$ contacts are closed, thereby completing the current path controlled by its first switching device, and its $r$ contacts are open.

(b) Where a selector is discordant its Q relay is not energised and hence its $q$ contacts are open. Whether or not its R relay is energised depends on whether the selected contact is above the distinctive contact or below it. If the selected contact is above the distinctive contact (this being the above-mentioned predetermined side of the distinctive contact) the R relay is energised, thereby completing the current path controlled by the second switching device (S2 and S0). If the selected contact is below the distinctive contact the R relay is not energised (S1). The first-mentioned condition of discordance will for convenience be referred to as active discordance (because the R relay is energised) and the other condition as passive discordance.

(c) Actuator 11 operates so long as any selector is discordant, whether actively or passively, for the Q relay of that selector is then unenergised with its $q$ contacts open, and hence the arresting means constituted by relay 22 is unenergised with its Break contacts 24 closed. When all the selectors are concordant the chain of closed $q$ contacts causes energisation of relay 22 to break the energising circuit of the actuator.

(d) Where a selector is discordant the direction in which the actuator drives the tool and the counter depends on whether the discordance is active or passive—assuming that the contacts of the R relay have control of relay 21 as described in more detail in the next paragraph; for if the discordance is active (selector S2 in FIG. 1) the closed $r$ contacts of the relay are causing energisation of relay 21, which by Make contacts 23 causes the actuator to move the tool forward and proportionately increase the count; whereas if the discordance is passive (S1) the open $r$ contacts cause relay 21 to be unenergised, and consequently the reversing means including Break contacts 23 cause the actuator to operate in the other direction, thereby moving the tool back and decreasing the count.

(e) When more than one selector is discordant, relay 21 is controlled by the $r$ contacts of only the selector of highest power significance which is discordant, the $r$ contacts of the discordant selectors of lower significance being cut out of the energising circuit of relay 21 by the q contacts of the discordant selector or selectors of higher significance. Hence the actuator operates first to bring the highest discordant selector into concordance; whereupon the resulting closure of the q contacts of that selector and the opening of its r contacts transfers the control of relay 21 to the discordant selector of next lower significance, and so on.

With the above points in mind, the following brief descriptions of the operation of the apparatus should easily be understood.

In operation, suppose that the number in the counter is zero and it is desired to preset the machine tool to the coordinate position represented by the number 2891. Wipers 16 are accordingly adjusted to "select" digit contacts 2, 8, 9, and 1 of switches S3 to S0 respectively. The condition of the apparatus is then as shown in FIG. 2, with each 0 contact of selectors S3 to S0 rendered distinctive by being energised from converter 13.

As the selectors are discordant, relay 22 is unenergised and the actuator is operating. As contacts q3 are open the only r contacts in control of relay 21 are contacts r3 of selector S3; the conditions of the other r contacts are therefore irrelevant. In selector S3 the discordance is active; hence the contacts r3 are closed to energise the actuator in the direction for moving the tool forwards towards the desired position whilst recording a digit in the counter for each unit movement of the tool along the coordinate axis.

The actuator continues to operate until the decimal number derived in converter 14 from the binary number in counter 13 reached the value 2000. In selector S3 the selected contact 2 is now the distinctive contact; in other words, selector S3 is now concordant. In consequence relay R3 releases to open contacts r3, and relay Q3 operates to close contacts q3. The condition of the apparatus is now as shown in FIG. 3.

The control of relay 21 has thus become transferred to the r contacts of the discordant selector of next lower significance, namely, selector S2, the r contacts of the lower selectors being still disconnected by contacts q2 and q1. As the discordance of this selector is also active, the actuator operates in the same sense as before until the number in the converter reaches the value 2800, whereupon contacts r2 open and q2 close to transfer the control to the next lower selector S1, see FIG. 4. The operation continues until the number in the converter has the desired value 2891. When finally selector S0 becomes concordant all the q contacts are closed, thereby energising relay 22 to break contacts 24 and stop the actuator from further movement.

Suppose now that, having preset the tool as above described to the position represented by the number 2891, it is desired to alter the position to that represented by the number 3741. The wipers 16 are accordingly readjusted to the appropriate new positions, whilst the distinctive digit contacts remain for the moment contacts 2, 8, 9, and 1, as before. The position is thus as shown in FIG. 5. Selector S3 is discordant with contacts q3 broken to render irrelevant the contact conditions of the other three selectors. Relay R3 is energised with contacts r3 closed. The actuator accordingly operates until the number in converter 14 reaches the value 3000, see FIG. 6. The control then passes to selector S2, where the distinctive contact is no longer contact 8 but contact 0. As the selected contact, contact 7, is above this, discordance is active and the actuator again operates in the forward direction until the count reached 3700. The operation thus continues, in the manner first described, until the tool has reached the position represented by the new number 3741.

If now it is desired to adjust the preset position of the tool in a backward direction, from, say, the position 3741 last reached to the position 2895, the operation is as follows from the moment when the wipers 16 have been adjusted to the appropriate digit contacts, see FIG. 7.

Selector S3 is passively discordant, that is, with relay R3 unenergised. The actuator thus operates in the direction for moving the tool back and decreasing the count until the position 2999 is reached, the control then passing to selector S2 (FIG. 8). Here again the discordance is passive and the actuator again decreases the count until the value 2899 is reached (FIG. 9). It will be observed that at this point not only are selectors S3 and S2 concordant but selector S1 is concordant also, since its selected contact is the distinctive contact 9. With contacts q3 to q1 thus closed and contacts r3 to r1 open, the control passes from selector S2 to selector S0, the discordance being again passive and the actuator continuing to operate in the direction for reducing the count until the tool has reached the position corresponding to the new number 2895 required.

Should the actuator overshoot when any selector reaches the concordant condition the Q contacts of that selector re-open so that the R relay regains control of the actuator. If just before the concordant condition was reached originally the R relay was in the operated condition the overshoot will be to the condition where it is not operated; accordingly the actuator is now operated in the reverse of its previous direction and so regains the correct position. Similarly where the overshoot was from the condition where the R relay was not operated: as the result of the overshoot it becomes operated, and the actuator is reversed as before.

Various details of the above-described embodiments may be modified within the scope of the invention. For example, as already stated, wipers 17 may not be needed where converter 14 does not require closed circuits in the unenergised leads. Wipers 15 may be on the other side of wipers 16, thereby engaging all the fixed contacts of greater digital significance than that of the selected contact, in other words so that an R relay is operated when the selected contact is below the distinctive contact, this being now the predetermined side of the distinctive contact; in this case it is necessary to reverse the connections to contacts 21 so that the actuator operates in the backward direction when an R relay is energised.

Instead of being constituted by the Break contacts of relay 22 and the spring which closes them when the relay is unenergised, the reversing means may be in the form of another relay similar to the R relay but connected for energisation when the selected contact is on the other side of the distinctive contact from the predetermined side.

Such an arrangement is shown in FIG. 10, as applied to the arrangement of FIG. 1. The only change at each selector is the provision of a third switching device in the form of a relay R3¹, R2¹, etc., as the case may be, connected between wiper 17 and earth so as to be energised whenever the selected contact is on the side of the distinctive contact opposite to the predetermined side. Each of the contact pairs r3¹, r2¹, etc., of the R¹ relays is connected in parallel with the corresponding contact pair r3, r2, etc., of that selector; but between earth and reversing means in the form of a relay 21¹. The arrangement is such that when the relay R of the highest discordant selector is energised, relay 21 is energised to connect the actuator to the positive source as before, whereas when the relay R¹ is energised, relay 21¹ is energised to connect the actuator to the negative source for operation in the reverse direction.

Where counter 13 operates in the decimal scale, converter 14 is not required, the arrays of leads A0 to A3 then originating at counter 13.

Instead of being in the form of relays, the switching devices may take the form of junction type transistors. Such an arrangement will now be described with reference to FIG. 11.

Each Q and R relay of the arrangement described with reference to FIG. 1 is replaced by a n-p-n transistor connected in the earthed-emitter manner and indicated by the same references used above for the current paths, namely q3, q2, etc., r3, r2, etc., as the case may be. The emitter-collector circuits of the four r transistors are connected in parallel with one another in the energising circuit of relay 21 with the emitter/collector circuits of the q transistors included in the respective parallel paths, the arrangement being very similar to that of FIG. 1 but with the transistors taking place of the q and r relay contacts. The base electrodes of the q and r transistors are connected to wipers 16 and 15, respectively, of the corresponding switches. All base electrodes are connected through resistors to the negative pole of the supply, the positive pole of which is connected to relay 21. Transistor q0 completes the series chain of transistors in the energising circuit of relay 22.

The operation is much the same as before; the engagement of any wiper 15 or 16 causes the emitter/collector circuit of the transistor to which it is connected to become conductive and so in effect completes that circuit, the transistor thus fulfilling the same function as the corresponding pair of relay contacts of the FIG. 1 arrangement.

When the reversing means is constituted by a further relay $21^1$, as described above with reference to FIG. 10, the corresponding arrangement using transistors instead of relays is as shown in FIG. 12, where each transistor r3, r2, etc., has in parallel with it a transistor $r3^1$, $r2^1$, etc., as the case may be, connected to relay $21^1$. The operation is similar to that of the arrangement of FIG. 10.

Transistors may also take place of relay 21, $21^1$, and 22.

In any of the above-described embodiments each selector may alternatively be in the form of a relay system. Such an arrangement will now be described with reference to FIG. 13 for the case where the switching devices are relays Q and R as in the embodiment first described.

Instead of a selector such as S0 or S1, etc., of the FIG. 1 arrangement, each power is provided with a selector in the form of a set of relays such as is shown in FIG. 11 in respect of the "nth" power. Each of the ten digits 0 to 9 is provided with a relay 0Pn to 9Pn, as the case may be, arranged to be energised as desired over the appropriate one of leads 31 and a common earth buswire 32. Each of these relays controls three sets of contacts indicated by the references Pn1 to Pn3 prefixed by the digit concerned.

The contact set 0Pn1 of relay 0Pn is a pair of Make contacts by means of which the relay when energised over the appropriate one of leads 31 locks itself onto a supply buswire 33, common to all the relays, and so remains energised until the supply is disconnected from the buswire by the momentary breaking of contacts 34, which are normally closed.

Contact set 0Pn2 is a pair of Break contacts.

Contact set 0Pn3 is in effect a single-pole changeover set. To the movable contact of this set is connected the digit lead 0 of the appropriate array An the leads of which are arranged to be energised as before by converter 14. The movable contact may therefore be considered as the digit contact, to be rendered distinctive in accordance with the number in the counter. The Make fixed contact of this set is connected to a buswire 35, common to all the relays, and thence to earth by way of the Qn relay. The Break fixed contact of the set is connected to one of the two Break contacts of the set 0Pn2, the other contact of which is connected to earth by way of the Rn relay.

The contacts of the other relays are similarly connected, except that the Pn2 contact which in the case of relay 0Pn is connected to relay Rn direct is now connected to relay Rn by way of a series chain of the Pn2 contacts for the digits of lower significance. Hence all the Pn2 contacts are connected in series, one end of the chain being connected to earth by way of the Rn relay; the other end, the end of higher significance, is connected to earth direct.

In operation, the selector is preset to the required digit—digit 2, say—by momentarily energising the lead 31 of relay 2Pn. This operation is equivalent to moving to the selected digit contact the wiper 16 of the arrangement of FIG. 1.

In response, this relay locks itself onto buswire 33 by way of its contacts 2Pn1. The positions of the three sets of contacts of this relay are then as depicted in FIG. 11. The Make contacts of changeover set 2Pn3 thus connect digit lead 2 of array An to relay Qn by way of buswire 35, just as wiper 16 of FIG. 1 connected the selected digit lead to the Q relay. The effect of the opening of the Break contacts 2Pn2 is to divide into two parts the series chain of these contacts, leaving connected through to relay Rn all the digit contacts of less significance than the selected one, and leaving the digit contacts of higher significance connected direct to earth. The two chains of interconnected closed contacts Pn2 separated from one another by the open contacts 2Pn2 thus correspond to the wipers 15 and 17 of FIG. 1.

When therefore the selected digit contact is the distinctive contact the Q relay is energised by way of the Make contacts 2Pn3. When on the other hand the selected contact is above the distinctive one the R relay is energised by way of the appropriate Break contacts Pn3, Pn2, and the Pn2 contacts of less digit significance, the selector being then in a condition of active discordance. And when the selected contact is below the distinctive one (passive discordance) the distinctive contact is connected direct to earth by way of its Pn3 Break contacts and the Pn2 contacts of higher digit significance.

Further details of the operation need not be given, since the conditions consequent upon the energisation or non-energisation of the Q and R relays are the same as described above with reference to FIG. 1.

When it is desired to select another digit, contacts 34 are momentarily opened to break the holding circuit of the Pn relay previously energised.

The Q and R relays may be replaced by transistors, as described above with reference to FIG. 11.

Presetting apparatus in accordance with the invention is thus of an inexpensive and simple construction and moreover obviates the need for a subtraction process whenever a number already preset in the counter has to be altered.

What we claim is:

1. Servo apparatus for adjusting the position of a movable member comprising an actuator for moving the member to a preselected position relative to a point of origin, an electronic counter operable by the actuator for indicating by the number in the counter the position of the member relative to the point of origin, for each power of the radix of a predetermined numerical system to the limit required a presettable selector having for each digit of that power a digit contact connected for distinctive energisation in accordance with the number in the counter, individual to each selector a first and a second switching device each for controlling a current path, arrangements for connecting any selected one of the digit contacts of the selector to said first switching device to cause it to complete the current path controlled by it when the selector is concordant, arrangements for causing the second switching device to complete the current path controlled by it when the said selected contact is on a predetermined side of the distinctive digit contact, an actuator-controlling device which when energised causes the actuator to operate the counter in one sense to increase or decrease the count according as the said predetermined side is above or below the distinctive contact, as the case may be, a network of said current paths in the energising circuit of the actuator-controlling device to allow that device to be controlled by the second switching device of only the selector of highest power significance which is discordant, reversing means for causing the actuator to operate the counter in the opposite sense when the actuator-controlling device is not energised and at least one selector is discordant, and arresting means for stopping the operation of the actuator when all the selectors are concordant.

2. Apparatus as claimed in claim 1 wherein the arrangement is such that only the distinctive contact of each selector is energised, said first-mentioned arrangements include for each selector a single wiper adjustable to connect the said selected contact to the first switching device of that selector, and said second-mentioned arrangements include for each selector a multiple wiper for connecting to the second switching device of that selector all the digit contacts of less or of greater digit significance than the selected contact, according as said predetermined side is above or below the distinctive contact, respectively.

3. Apparatus as claimed in claim 1 wherein the arrangement is such that only the distinctive contact of each selector is energised, and each selector includes a relay system having for each digit of the power concerned a relay arranged for preset energisation and controlling a pair of Make contacts, including the corresponding digit contact, for connecting the digit contact to the first switching device of that selector, and a first pair of Break contacts, including the digit contact, for connecting the digit contact to the second switching device of that selector by way of a series chain of contacts including a second pair of Break contacts of the relay and the corresponding Break contacts of each relay for a digit of less or of greater digit significance than the selected contact, according as said predetermined side is above or below the distinctive contact, respectively.

4. Apparatus as claimed in claim 1 wherein each of said switching devices is a relay which controls Make contacts constituting the said current paths of the device, and said network includes the said contacts of the second switching devices connected electrically in parallel with one another in the energising circuit of the actuator-controlling device, each parallel connection in respect of a selector of other than the highest power significance being completed by way of a series chain of the said contacts of the first switching device of each selector of higher power significance.

5. Apparatus as claimed in claim 1 wherein each of said switching devices is a junction type transistor the emitter-collector path of which constitutes the said current path of the device, and said network includes the emitter-collector paths of the second switching devices connected electrically in parallel with one another in the energising circuit of the actuator-controlling device, each parallel connection in respect of a selector of other than the highest power significance being completed by way of a series chain of the emitter-collector paths of the first switching device of each selector of higher power significance.

6. Apparatus as claimed in claim 1 wherein said reversing means includes a pair of Break contacts controlled by said actuator-controlling device and arranged to energise the actuator to operate the counter in the opposite sense to said one sense.

7. Apparatus as claimed in claim 1 wherein said reversing means includes in respect of each selector a third switching device for controlling a current path, arrangements for causing the device to complete its current path when the selected contact is on the other side of the distinctive contact from said predetermined side, a second actuator-controlling device which when energised causes the actuator to operate the counter in the opposite sense to said one sense, these current paths being connected electrically in parallel with one another in the energising circuit of the second actuator-controlling device, each parallel connection in respect of a selector of other than the highest power significance being completed by way of a series chain of the emitter-collector paths of the first switching device of each selector of higher power significance.

8. Apparatus as claimed in claim 1 wherein said arresting means includes an ON/OFF device arranged when energised to break the energising circuit of the actuator, there being included in the energising circuit of this ON/OFF device the current paths of all the first switching devices in series.

References Cited in the file of this patent
UNITED STATES PATENTS

| | | |
|---|---|---|
| 2,656,497 | Schweighofer | Oct. 20, 1953 |
| 2,710,934 | Senn | June 14, 1955 |
| 2,721,967 | Olin | Oct. 25, 1955 |
| 2,755,425 | Reid | June 17, 1956 |
| 2,758,270 | Cummings | Aug. 7, 1956 |
| 2,823,344 | Ragland | Feb. 11, 1958 |
| 2,853,664 | Towns et al. | Sept. 23, 1958 |
| 2,884,577 | Coppin | Apr. 28, 1959 |
| 2,922,940 | Mergler | Jan. 26, 1960 |